United States Patent [19]
Callens et al.

[11] Patent Number: 5,783,239
[45] Date of Patent: Jul. 21, 1998

[54] FROZEN CONFECTIONERY CONTAINING GRANULATES FOR EFFERVESCENCE UPON CONSUMPTION

[75] Inventors: Ginette Callens; Philip Igor Cathenaut, both of Beauvais, France

[73] Assignee: Nestec S.A., Vevey, Switzerland

[21] Appl. No.: 763,126

[22] Filed: Dec. 11, 1996

[30] Foreign Application Priority Data

Dec. 12, 1995 [EP] European Pat. Off. ............. 95203450

[51] Int. Cl.$^6$ ........................................................ A23G 9/00
[52] U.S. Cl. ..................... 426/68; 426/100; 426/101; 426/249; 426/134; 426/302; 426/307; 426/512; 426/514; 426/515; 426/518; 426/565; 426/660
[58] Field of Search ........................ 426/249, 100, 426/101, 565, 67, 68, 66, 660, 134, 302, 307, 512, 514, 515, 518

[56] References Cited

U.S. PATENT DOCUMENTS

| | | | |
|---|---|---|---|
| 1,429,405 | 9/1922 | Carter et al. | 426/249 |
| 1,839,719 | 1/1932 | Walter | 426/249 |
| 2,029,025 | 1/1936 | Justheim | 426/565 |
| 2,048,364 | 7/1936 | Willems | 426/101 |
| 2,176,408 | 10/1939 | Peterson | 426/101 |
| 2,747,525 | 5/1956 | Lund | 426/249 |
| 2,801,922 | 8/1957 | Oprean | 426/101 |
| 2,975,732 | 3/1961 | Pasquale | 426/249 |
| 3,360,384 | 12/1967 | Kurzinski et al. | 426/565 |
| 3,365,304 | 1/1968 | Guterman et al. | 426/565 |
| 3,503,757 | 3/1970 | Rubenstein | 426/565 |
| 3,623,889 | 11/1971 | Falconer et al. | 99/134 |
| 3,770,460 | 11/1973 | Vroman | 426/249 |
| 3,969,531 | 7/1976 | Cornelius | 426/565 |
| 3,971,853 | 7/1976 | Crowder | 426/249 |
| 4,031,262 | 6/1977 | Nakayama et al. | 426/565 |
| 4,286,890 | 9/1981 | Dickmann et al. | 401/19 |
| 4,310,559 | 1/1982 | Mita et al. | 426/249 |
| 4,353,927 | 10/1982 | Lovercheck | 426/249 |
| 4,738,862 | 4/1988 | Bee | 426/565 |
| 4,986,080 | 1/1991 | Grigoli et al. | 426/100 |
| 5,055,315 | 10/1991 | Bee | 426/101 |
| 5,256,426 | 10/1993 | Tomioka et al. | 426/249 |
| 5,343,710 | 9/1994 | Cathenaut et al. | 426/249 |
| 5,356,648 | 10/1994 | Kortschot | 426/249 |
| 5,374,436 | 12/1994 | White et al. | 426/249 |
| 5,494,692 | 2/1996 | Beyer et al. | 426/393 |
| 5,516,540 | 5/1996 | Cathenaut | 426/249 |
| 5,582,856 | 12/1996 | White et al. | 426/249 |
| 5,624,700 | 4/1997 | Ogden | 426/576 |

FOREIGN PATENT DOCUMENTS

| | | |
|---|---|---|
| 0437927A2 | 7/1991 | European Pat. Off. |
| 0437927A3 | 7/1991 | European Pat. Off. |
| 0674841A1 | 10/1995 | European Pat. Off. |
| 1573397 | 7/1969 | France. |
| 1136721 | 12/1968 | United Kingdom. |

OTHER PUBLICATIONS

Derwent Publications Ltd., WPI Database Accession No. 80-33934c, Abstract of Japanese Patent Document no. JP-B-55 013 708 (1980).

Derwent Publications Ltd., WPI Database Accession No. 73-45415u, Abstract of Japanese Patent Document No. JP-A-48 026 233 (1973).

Derwent Publications Ltd., WPI Database Accession No. 70-28790r, Abstract of Japanese Patent Document No. JP-B-45 010 591 (1970).

*Primary Examiner*—Cynthia L. Nessler
*Attorney, Agent, or Firm*—Vogt & O'Donnell, LLP

[57] ABSTRACT

Articles of frozen confectionery which effervesce upon consumption contain frozen granitas and effervescent reagents. In one embodiment, first and second frozen granitas which contain differing effervescent reagents, where the reagents, in aqueous solution, react to produce carbon dioxide, are prepared and then admixed. In another embodiment, frozen granitas are admixed with a dry mix of effervescent reagents where the reagents, in aqueous soltuion, react to produce carbon dioxide. In either embodiment, the admixture is metered into a mold and tamped to obtain an article which also may include a shell or coating.

33 Claims, 3 Drawing Sheets

FROZEN CONFECTIONERY CONTAINING GRANULATES FOR EFFERVESCENCE UPON CONSUMPTION

BACKGROUND OF THE INVENTION

The present invention concerns an article of frozen confectionery which effervesces as it is consumed, as well as a process for manufacturing such an article.

The preparation of frozen articles which effervesce in contact with water in the mouth when consumed and hence produce a fizzing sensation of the same order as that obtained in gassy drinks, presents a problem. In gassy drinks, the fizzing sensation is derived from carbon dioxide under pressure. In an ice, this gas dissolves and evaporates without producing the desired sensation.

A solution to the problem presented has been proposed, for example in French Pat. No. 1.573.397, by incorporating in the ice powdered effervescent reagents which are enclosed in a substance impermeable to water, a fatty material, capable of becoming liquid in the mouth and of then liberating reagents which, once put into contact in solution with water, react with evolution of carbon dioxide gas. The effervescent reagents are preferably dispersed together in the fatty material by means of a dispersing agent, and the mixture is then put into the form of microbeads by spraying into liquid nitrogen. This process is quite complicated and the sensation of effervescence obtained in the mouth is slight on account of the necessity of using a fat for coating having a relatively high melting point which can only liberate the effervescent reagents slowly since it does not melt rapidly enough in the mouth.

In patent application European Patent Application Publication No. 0764841, the problem has been resolved in connection with the manufacture of ice-lollies by separating the effervescent reagents from each other by placing them in longitudinally juxtaposed frozen layers. This solution, however, has limits since it requires the formation, first of all, of a core from separate longitudinal layers in several moulding stages by the so-called product-in-product technique, in a first series of moulds, followed by insertion of the core and the formation of a coating or supplement in a second series of moulds.

SUMMARY OF THE INVENTION

The present invention provides a process for manufacturing an article of frozen confectionery containing effervescent reagents characterized in that there is frozen separately, on the one hand, a first type of granita from a composition containing a first effervescent reagent, and on the other hand, a second type of granita from a composition containing a second type of effervescent reagent able to react with the first in the mouth to produce a sensation of effervescence, and in that the two types of granita are mixed, that they are metered into moulds and that they are tamped in the moulds.

The invention also provides a frozen article of confectionery containing effervescent reagents, able to produce a fizzing sensation in the mouth by rapid liberation of carbon dioxide gas, characterized in that the effervescent reagents are separated from each other by being enclosed in frozen granulates without the involvement of a water impermeable agent.

The present invention also includes variants of the article and the process, as described further below, wherein the effervescent reagents are mixed dry in powder form and mixed with frozen granulates.

DETAILED DESCRIPTION OF THE INVENTION

In the following description and claims, frozen granulates and flakes will be referred to as "granitas".

The composition of the granitas is that of a water ice or sorbet, containing sugars, which is coloured and flavoured and in principle not aerated or aerated to a small extent.

Articles of frozen confectionery within the scope of the invention may be bars, lollies, small filled ices, cones or small tubs. What is necessary is that the granitas containing the reagents are mixed in a certain proportion and melt in the mouth and that the reagents thus come into contact as soon as the article is sucked, crunched or consumed with a spoon.

According to the invention, these are preferably ice-lollies on a stick or small cylinders for sucking or crunching contained in a sheath from which they are extracted progressively by pressure.

The article may have a homogeneous appearance with the granitas not differentiated visually or may be composed of contrasting juxtaposed layers based on granitas with different colours, sizes and flavours, giving decorative or textured effects.

The article, for example an ice-lolly, may also be a composite, for example consisting of an outer shell manufactured by the conventional method of freezing an outer layer in a mould and extracting the still liquid centre, which forms a cavity into which the granitas may be metered. The outer layer may have an inert composition.

As a variant, the article may consist of dry reagents, in powder form, preferably diluted in the absence of water in an excipient, for example glucose syrup, mixed at low temperature, for example of the order of −30° C., with the granita which may then be inert and constitute a support. The mass of granita may also contain inclusions, in particular pieces of fizzy, effervescent confectionery such as, for example PETA ZETA, which keep their property when they are mixed with granitas.

In order to put the process of the present invention into practice, mixtures may consist of two types of granita taking into account the respective nature and volumes of the reagents of the granitas dictated, where appropriate, by the shape of the article in proportions enabling the most complete reaction to take place by melting in the mouth. This being achieved, effervescence may be regulated by means of the concentrations of the reagents.

As effervescent reagents, use may be made of any edible compounds able to react with each other to produce carbon dioxide gas in aqueous solution. Use will preferably be made on the one hand of a suitable water soluble carbonate, for example sodium or potassium bicarbonate, and on the other hand of an acid, for example malic, tartaric, lactic or preferably citric acid. The granitas are manufactured in a conventional manner by dissolving the effervescent agent in the aqueous phase, and then freezing it in a thin layer and coarsely breaking it up into flakes at a low temperature.

In order to mask foreign, respectively salty and acid flavours introduced by the effervescent reagents, it is possible, preferably, to increase for example the solids content of the composition containing the acid, for example by adding carbohydrates in the form of fruit pulp.

According to a variant of the process, the effervescent reagents may be mixed dry, in the form of a powder with the granita at a low temperature, for example at about −30° C. without the powders dissolving. In-as-much-as the pure reagents are too concentrated to be incorporated as they are, they are preferably diluted by dry mixing with an excipient, for example a glucose syrup. In this case, there is only one inert granita which consists of a support for the reagents, and the process thereby provides a product which is a frozen confectionery article comprising an admixture of (i) a mixture of first and second effervescent reagents in an excipient wherein the reagents, in aqueous solution, react to produce carbon dioxide and (ii) frozen granitas which comprise frozen water. Pieces may be incorporated in the granita, in particular of fizzy, effervescent confectionery, for example PETA ZETA, which preserve their property when they are mixed with granitas.

In order to manufacture composite articles, such as those mentioned previously, freezing of a shell may be carried out by metering a composition into a mould and sucking out the still liquid centre, and then the mixture of granitas is poured into the cavity thus created. The shell may optionally contain one of the effervescent reagents and the granita the other.

In the special case of ice-lollies on a stick, it may prove advantageous to produce interstices in the central part of the lolly, for example with the aid of a spike, and then to meter in a liquid composition which, by infiltrating into the interstices and freezing, may act as a reinforcement for consolidating the granitas and also serve as an anchor for the stick.

The accompanying drawings described below illustrate the invention by way of example.

DETAILED DESCRIPTION OF THE DRAWINGS

Figure 1:
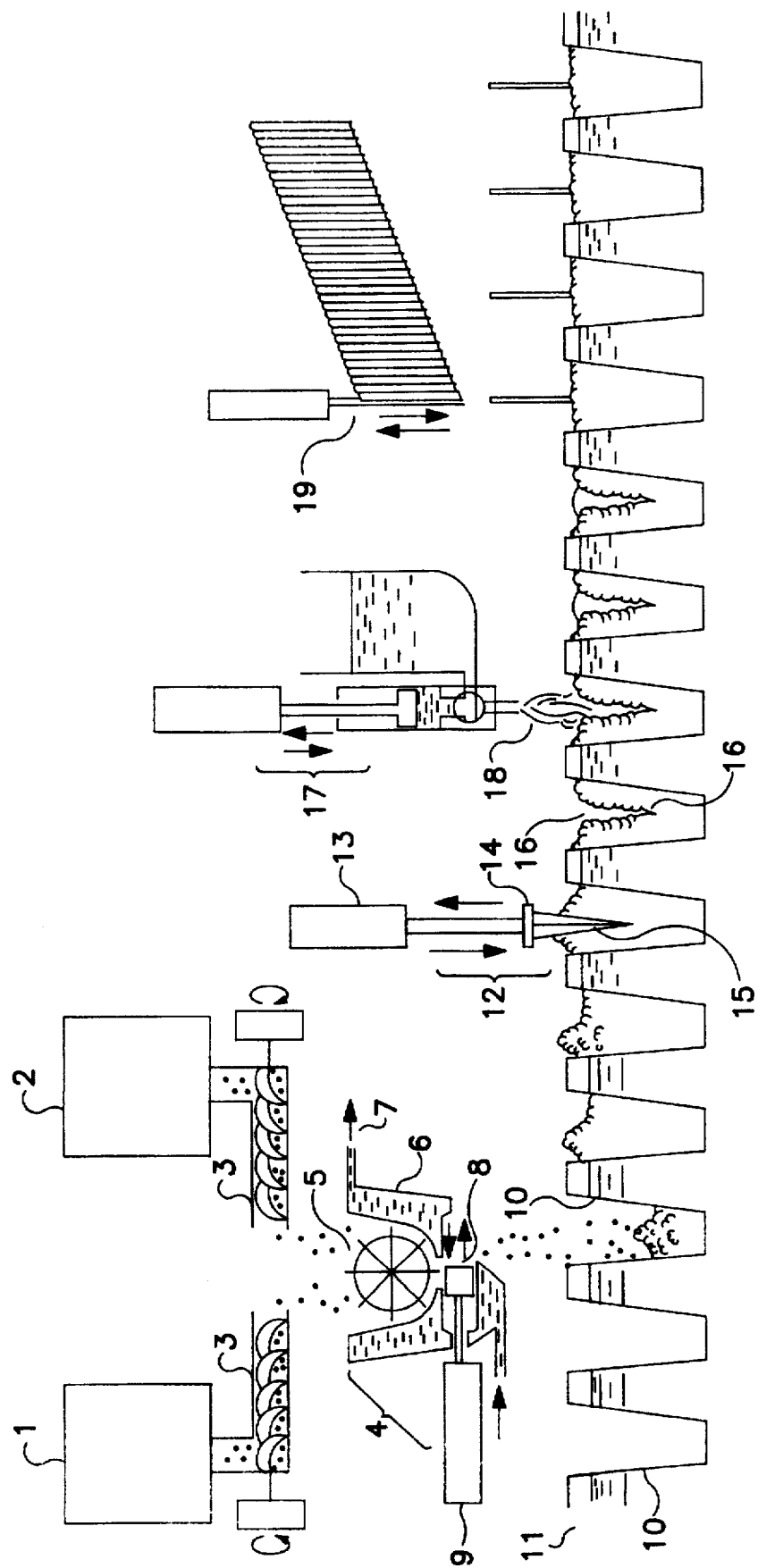
FIG. 1 is an overall diagrammatic view of the manufacturing process for a particular embodiment of an ice-lolly on a stick.

In FIG. 1, the device 1 produces an acid granita containing citric acid from a sweetened and flavoured aqueous solution of citric acid by freezing and flaking at low temperature. Similarly, the device 2 produces a granita containing bicarbonate from a sweetened and flavoured aqueous solution of sodium bicarbonate. The devices 1 and 2 are placed close to the freezing line.

Each of the granitas is led by the Archimedean screws 3 to a metering device 4 provided with a mixing/scraping component 5. The hopper 6 of the metering device 4 is provided with double wall in which a cooling fluid 7 circulates, coming from a branch from the freezing tank of the machine making ice-lollies on sticks, for example calcium chloride brine or water containing glycol. It is necessary in point of fact for the temperature of the inner surface of the metering device to be very low, for example about −30° C., so that the granita does not melt during mixing and metering so that a frozen granita admixture is obtained and metered.

The bottom of the hopper 6 is open over as many metering chambers as there are tracks on the freezing line. In order to meter the chosen quantity of granitas, the pistons 8 operated by rams 9 discharge the mixture of granitas into the moulds 10, arranged in rows, attached to a chain 11 for conveying rows of moulds passing stepwise in the direction of the arrow f1. At each step of the chain 11 for conveying the rows of moulds 10, the rows progress and the various operations are carried out between each movement of the chain.

After filling the moulds 10, which provides a frozen granita admixture structure in the mould a tamping device 12 operated by a ram 13 descends and tamps the granita by compressing it. The tamper 12 has two parts, each of which fulfills a function. Its upper part 14, which is flat and the cross section of which is adjusted to that of the mould and naturally must not exceed this, has the task of compressing the granita to fill the voids, whereas its lower part 15, in the form of a spike, produces interstices 16 throughout all the height of the mass of granita.

Starting with the metering device 17, a small quantity of liquid composition 18 is caused to flow into the interstices 16 formed by the spike of the tamping device. This composition may be neutral or flavoured. It may be coloured. By infiltrating to a variable extent into the granita and by freezing, this supplement will constitute a reinforcement intended to consolidate the granita which would have the tendency to disaggregate on impact. This reinforcement also serves as a point of anchorage for the stick. In-as-much-as the composition which constitutes this supplement is coloured, for example with another colour than the granita, it may contribute to decorating the outer and upper surfaces of the article, for example if the interstices pass through it.

The operations which follow, of inserting a stick by means of a device 19, then ejecting from the mould, wrapping and packaging (the latter operations not being shown) are conventional. A supplementary coating operation may be provided which is also conventional (not shown), for example by dipping in an aqueous composition after ejection from the mould, so as to protect the granita from thermal and mechanical shocks.

Figure 2:
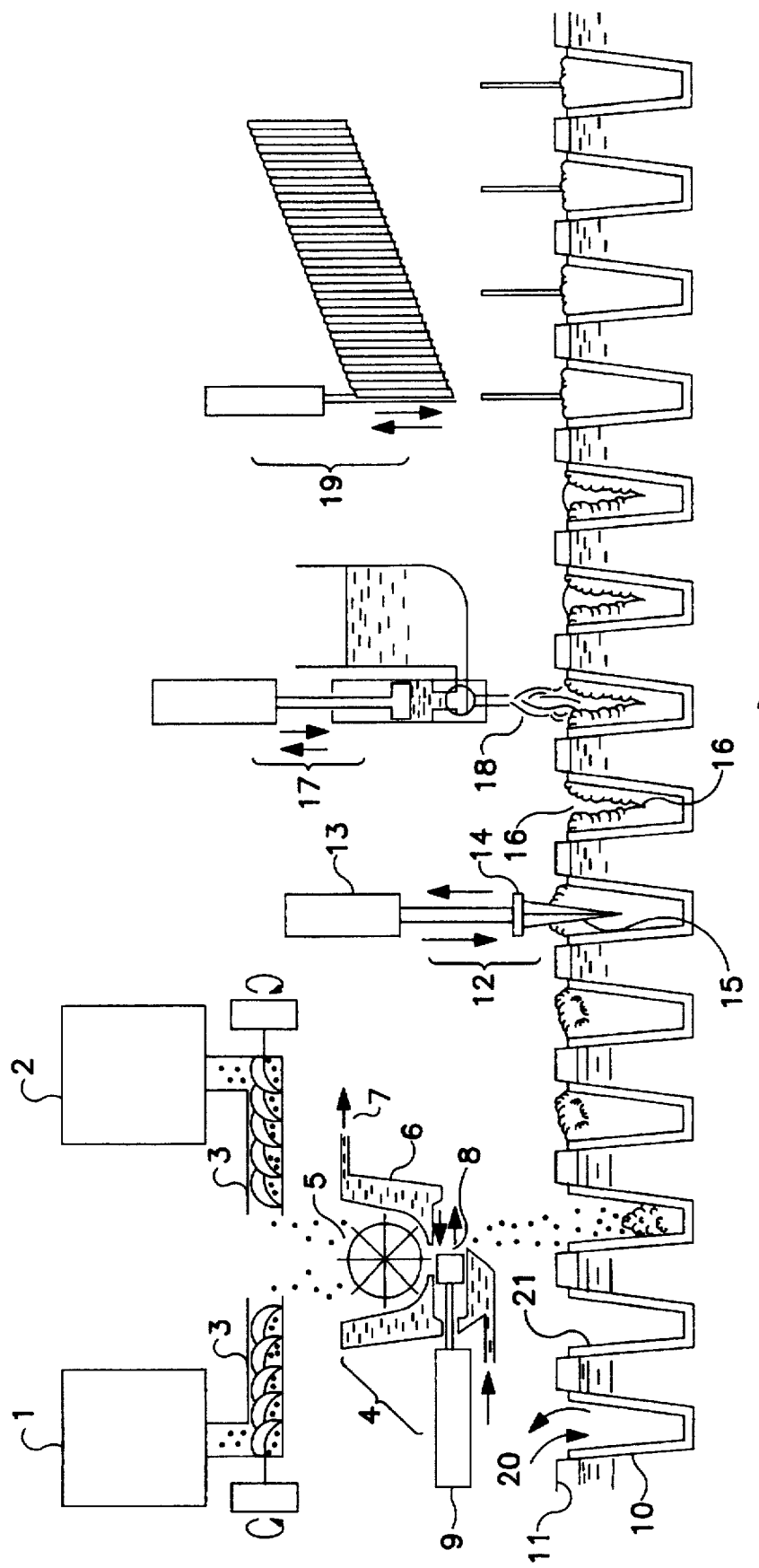
FIG. 2 is an overall diagrammatic view of the process for manufacturing a particular embodiment of a composite ice-lolly on a stick.

In FIG. 2, the operations are similar to those shown in FIG. 1, except that a liquid composition to be frozen 20 is first of all metered in the moulds 10, and then after having frozen the surface, the centre is withdrawn so as to form a shell 21. After this, the operations indicated in FIG. 1 are carried out, starting with the shell 21 as the mould. A composite ice-lolly on a stick is manufactured in this way.

Figures 3, 4, 5, 6:
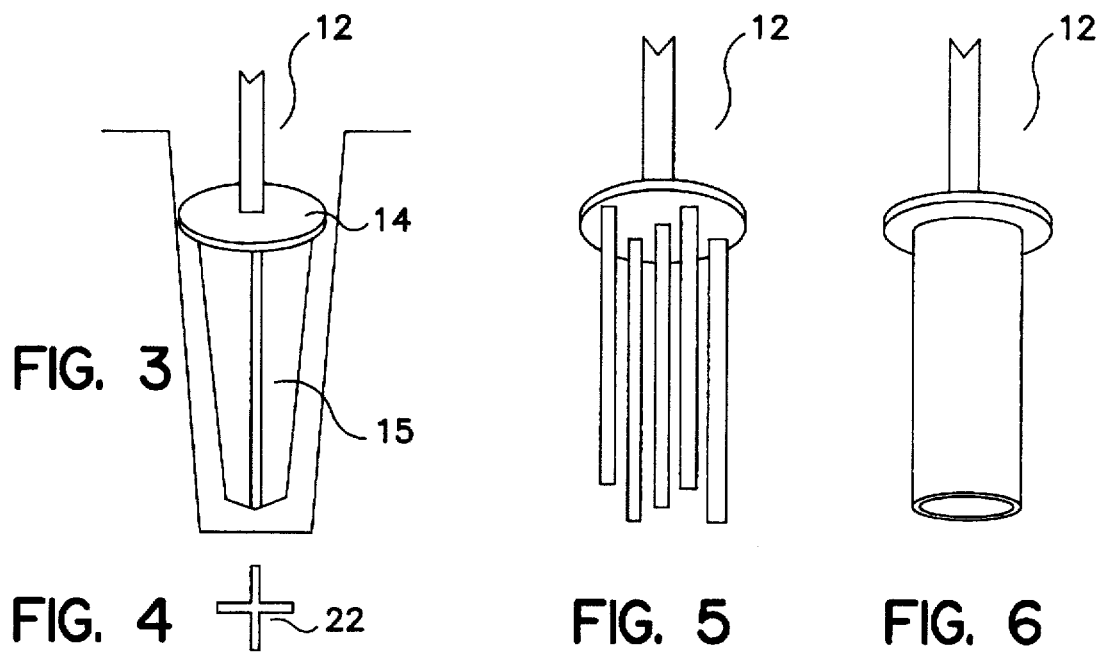
FIGS. 3, 4, 5 and 6 illustrate various tamping components.

In FIG. 3, the tamping device 12 comprises a flat upper surface 14 which acts as a piston compressing the granita in the mould and a lower part 15 in the form of a spike. FIG. 4 shows the cruciform section 22 of the spike which has the advantage of producing interstices in the granita which, once filled with a liquid composition and once this composition has frozen, have a rigid reinforcing structure which extends close to the surface of the article.

FIGS. 5 and 6 show particular forms of the tamper, adapted to different types of moulds.

Figures 7, 8:
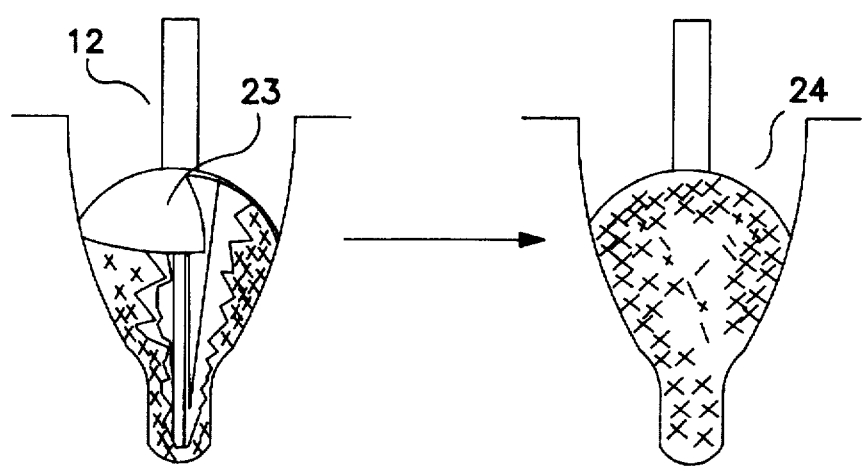
FIGS. 7 and 8 illustrate the manufacture of an ice-lolly on a stick with a particular, so-called three dimensional shape.

As shown in FIG. 7, the upper part of the tamper is in the form of a dome 23, which has the function of stamping out the upper part of the granita. In point of fact, the granita has the property of being formable. This property enables three-dimensional articles to be moulded such as 24 (FIG. 8) without having to make use of countermoulds, which considerably simplifies the equipment.

The process described previously enables large diameter articles to be frozen up to the width of the mould bars. In point of fact, since the mass of granita is already frozen at the moment it is metered in, it is not necessary to reduce the speed of the machine to give time for the article to freeze to the core, this time being a function of the diameter of the article for a given temperature. Moreover, the liquid composition inserted into the interstices freezes very rapidly in contact with the granita to form an inner reinforcement for the articles.

We claim:

1. A frozen confectionery article comprising first and second frozen granitas in admixture wherein the first and second granitas comprise frozen water containing differing effervescent reagents and wherein the first granitas contain a first effervescent reagent and the second granitas contain a different, second effervescent reagent which, in aqueous solution, reacts with the first reagent to produce carbon dioxide.

2. A frozen confectionery article comprising an admixture of (i) a mixture of first and second effervescent reagents and an excipient wherein the reagents, in aqueous solution, react to produce carbon dioxide and (ii) frozen granitas which comprise frozen water.

3. An article according to claim 1 or 2 wherein the first reagent is a water-soluble carbonate and the second reagent is an acid.

4. An article according to claim 3 wherein the water-soluble carbonate is selected from the group consisting of sodium bicarbonate and potassium bicarbonate and the acid is selected from the group consisting of malic acid, tartaric acid, lactic acid and citric acid.

5. An article according to claim 1 further comprising a frozen liquid which consolidates the granitas.

6. An article according to claim 5 further comprising a stick extending from the consolidated granitas and frozen liquid.

7. An article according to claim 1 or 2 wherein the granitas which comprise frozen water are a sorbet.

8. A process for preparing a frozen confectionery article comprising:
   separately preparing frozen first granitas and frozen second granitas wherein the first and second granitas comprise frozen water and contain differing effervescent reagents wherein the first granitas contain a first effervescent reagent and the second granitas contain a different, second effervescent reagent and wherein the first and second reagents are reagents which, in aqueous solution, react to produce carbon dioxide;
   mixing the frozen first granitas with the frozen second granitas so that frozen granitas in admixture are obtained;
   metering the frozen granita admixture into a mold so that a frozen granita admixture structure is obtained in the mold; and
   tamping the frozen granita admixture structure in the mold to obtain a frozen granita article.

9. A process according to claim 8 wherein the first reagent is a water-soluble carbonate and the second reagent is an acid.

10. A process according to claim 9 wherein the water-soluble carbonate is selected from the group consisting of sodium bicarbonate and potassium bicarbonate and the acid is selected from the group consisting of malic acid, tartaric acid, lactic acid and citric acid.

11. A process according to claim 9 wherein the granitas which contain the acid further contain fruit pulp.

12. A process according to claim 8 further comprising, prior to metering the frozen granita admixture into the mold, metering a freezable liquid composition into the mold and freezing the composition so that a mold shell forms about unfrozen liquid, sucking out the unfrozen liquid from the shell and mold to obtain a mold shell for containing the frozen granita admixture and then metering the frozen granita admixture into the mold so that the frozen granita admixture structure in the mold is contained within the shell.

13. A process according to claim 8 or 12 wherein the frozen granita admixture structure is tamped so that interstices are formed in the shaped frozen granita admixture structure and further comprising metering a freezable liquid composition into the mold and freezing the liquid composition so that the liquid composition infiltrates the interstices and freezes to consolidate the granitas.

14. A process according to claim 13 wherein the interstices are formed for providing an interstice area for receiving a stick and further comprising introducing a stick into the interstice area and wherein the liquid composition is metered so that the stick is anchored by frozen liquid composition.

15. A process according to claim 8 further comprising demolding the frozen granita article to obtain a demolded article and coating the demolded article with an aqueous composition.

16. A process according to claim 8 further comprising mixing pieces of an effervescent confectionery with the frozen first and second granitas so that the frozen granita admixture and the frozen granita admixture structure contain effervescent confectionery inclusions.

17. A process for preparing a frozen confectionery article comprising:
   mixing an excipient with first and second effervescent reagents, wherein the first and second reagents are reagents which, in aqueous solution, react to produce carbon dioxide, to obtain an effervescent reagent mixture in the absence of water;
   mixing frozen granitas which comprise frozen water with the effervescent reagent mixture so that frozen granitas and the reagent mixture are obtained in admixture;
   metering the frozen granita and reagent admixture into a mold so that a frozen granita and reagent admixture structure is obtained in the mold; and
   tamping the frozen granita and reagent admixture structure in the mold to obtain a frozen granita and reagent admixture article.

18. A process according to claim 17 wherein the first reagent is a water-soluble carbonate and the second reagent is an acid.

19. A process according to claim 18 wherein the water-soluble carbonate is selected from the group consisting of sodium bicarbonate and potassium bicarbonate and the acid is selected from the group consisting of malic acid, tartaric acid, lactic acid and citric acid.

20. A process according to claim 17 wherein the excipient is glucose syrup.

21. A process according to claim 17 further comprising, prior to metering the frozen granita and reagent admixture into the mold, metering a freezable liquid composition into the mold and freezing the composition so that a mold shell forms about unfrozen liquid, sucking out the unfrozen liquid from the shell and mold to obtain a mold shell for containing the frozen granita and reagent admixture and then metering the frozen granita and reagent admixture into the mold so that the frozen granita and reagent admixture structure in the mold is contained within the shell.

22. A process according to claim 17 further comprising demolding the frozen granita and reagent admixture article to obtain a demolded article and coating the demolded article with an aqueous composition.

23. A process according to claim 17 further comprising mixing pieces of an effervescent confectionery with the frozen granitas and with the reagent admixture so that the frozen granita and reagent admixture and the shaped frozen granita and reagent admixture structure contain effervescent confectionery inclusions.

24. The product of the process of claim 8.

25. The product of the process of claim 13.

26. The product of the process of claim 13.
27. The product of the process of claim 14.
28. The product of the process of claim 15.
29. The product of the process of claim 16.
30. The product of the process of claim 17.

31. The product of the process of claim 21.
32. The product of the process of claim 22.
33. The product of the process of claim 23.

* * * * *

UNITED STATES PATENT AND TRADEMARK OFFICE
CERTIFICATE OF CORRECTION

PATENT NO. : 5,783,239
DATED : July 21, 1998
INVENTOR(S) : Ginette CALLENS, *et al.*

It is certified that error appears in the above-indentified patent and that said Letters Patent is hereby corrected as shown below:

Column 6, line 28, (line 9 of claim 17) after "that", insert -- the --.

Column 6, line 67 (claim 25) delete "13" and insert therefor -- 12 --.

Signed and Sealed this

Twenty-second Day of September, 1998

Attest:

BRUCE LEHMAN

Attesting Officer      *Commissioner of Patents and Trademarks*